United States Patent [19]
Lewczyk et al.

[11] Patent Number: 5,902,005
[45] Date of Patent: May 11, 1999

[54] LOCKING ARMREST SUPPORT ASSEMBLY

[75] Inventors: Ronald S. Lewczyk, New Lenox; Paul E. Gass, Mokena; Philip A. Taylor, New Lenox, all of Ill.

[73] Assignee: Illinois Tool Works Inc., Glenview, Ill.

[21] Appl. No.: 08/762,406

[22] Filed: Dec. 9, 1996

[51] Int. Cl.⁶ .................................................. B60N 2/46
[52] U.S. Cl. ..................................... 296/153; 297/411.21
[58] Field of Search ...................... 296/153; 297/411.21, 297/411.45

[56] References Cited

U.S. PATENT DOCUMENTS

| | | | |
|---|---|---|---|
| 2,601,677 | 6/1952 | Wettlaufer | 296/153 X |
| 4,226,464 | 10/1980 | Janz et al. | 296/153 |
| 5,445,430 | 8/1995 | Nichols | 296/153 |

FOREIGN PATENT DOCUMENTS

| | | | |
|---|---|---|---|
| 34660 | 9/1981 | European Pat. Off. | 296/153 |
| 63294 | 10/1982 | European Pat. Off. | 296/153 |

*Primary Examiner*—Joseph D. Pape
*Attorney, Agent, or Firm*—Kane,Dalsimer,Sullivan, Kurucz, Levy, Eisele and Richard, LLP

[57] ABSTRACT

The apparatus provides a locking mechanism for an armrest of an automobile or similar motor vehicle to a structural pin or post. The mechanism includes a cap with a lateral slit into which a button and spring are assembled. The spring outwardly biases the button which is limited in its outward travel by a detent arrangement which maintains the outer portion of the button flush with the cap. In this arrangement; the spring further engages a circumferential slot on the structural pin or post thereby locking the armrest to the structural pin or post. However, in order to remove the armrest from the structural pin or post, the user pushes the button inwardly, thereby compressing the spring and moving the spring out of the circumferential notch thereby unlocking the armrest from the structural pin or post and allowing the free removal thereof.

8 Claims, 2 Drawing Sheets

LOCKING ARMREST SUPPORT ASSEMBLY

BACKGROUND OF THE INVENTION

1. Field of the Invention

The present invention relates to a locking armrest support assembly for an automobile or similar motor vehicle. More specifically, the invention relates to a locking armrest support assembly with a sleeve which sliding accommodates a rod of the armrest and a cap at the upper end thereof including a locking device which engages with notches in the rod of the armrest to lock the armrest in position. A button is provided, however, in the cap to compress the spring and to unlock the armrest easily when desired.

2. Description of the Prior Art

In the prior art, the installation and subsequent removal of an armrest in an automobile or similar motor vehicle has been a somewhat involved, time-consuming process. This is particularly true in view of the high number of automobiles or similar vehicles produced and subsequently serviced. While some solutions are available which would make the armrest simple to install and to remove, these solutions would not be satisfactory in that the armrest would not be adequately installed to the vehicle and may become unfastened at undesired times.

A locking headrest support assembly using a locking spring is disclosed in U.S. patent application Ser. No. 08/580,755, filed Dec. 29, 1995, assigned to the present assignee.

OBJECTS AND SUMMARY OF THE INVENTION

It is therefore an object of this invention to provide a locking armrest support assembly which can be quickly and easily installed and subsequently removed from an automobile or similar motor vehicle.

It is therefore a further object of this invention to provide a locking armrest support assembly which attaches securely to a motor vehicle and is not likely to become unfastened at undesired times.

These and other objects are attained by providing a locking armrest support assembly which includes a sleeve which is preferably a molded integral part of the plastic armrest but can be provided as a separate part. The sleeve includes a cap which is positioned on top of the armrest The sleeve engages an inwardly concentric post or pin which is a structural part of the automobile seat frame. A locking spring within the cap engages a notch within the post or pin. The cap includes a button on a lateral side thereof, which is ordinarily in a flush configuration and which can be pushed to disengage the spring from the notch in the post, thereby allowing the armrest to be quickly and easily removed from the vehicle without the use of special tools. However, during the normal usage of the apparatus, the spering tightly engages the notch in the post and likewise biases the button outwardly thereby preventing any inadvertent disconnection.

BRIEF DESCRIPTION OF THE DRAWINGS

Further objects and advantages of the invention will become apparent from the following description and claims, and from the accompanying drawings, wherein:

DETAILED DESCRIPTION OF THE PREFERRED EMBODIMENT

Figure 1:
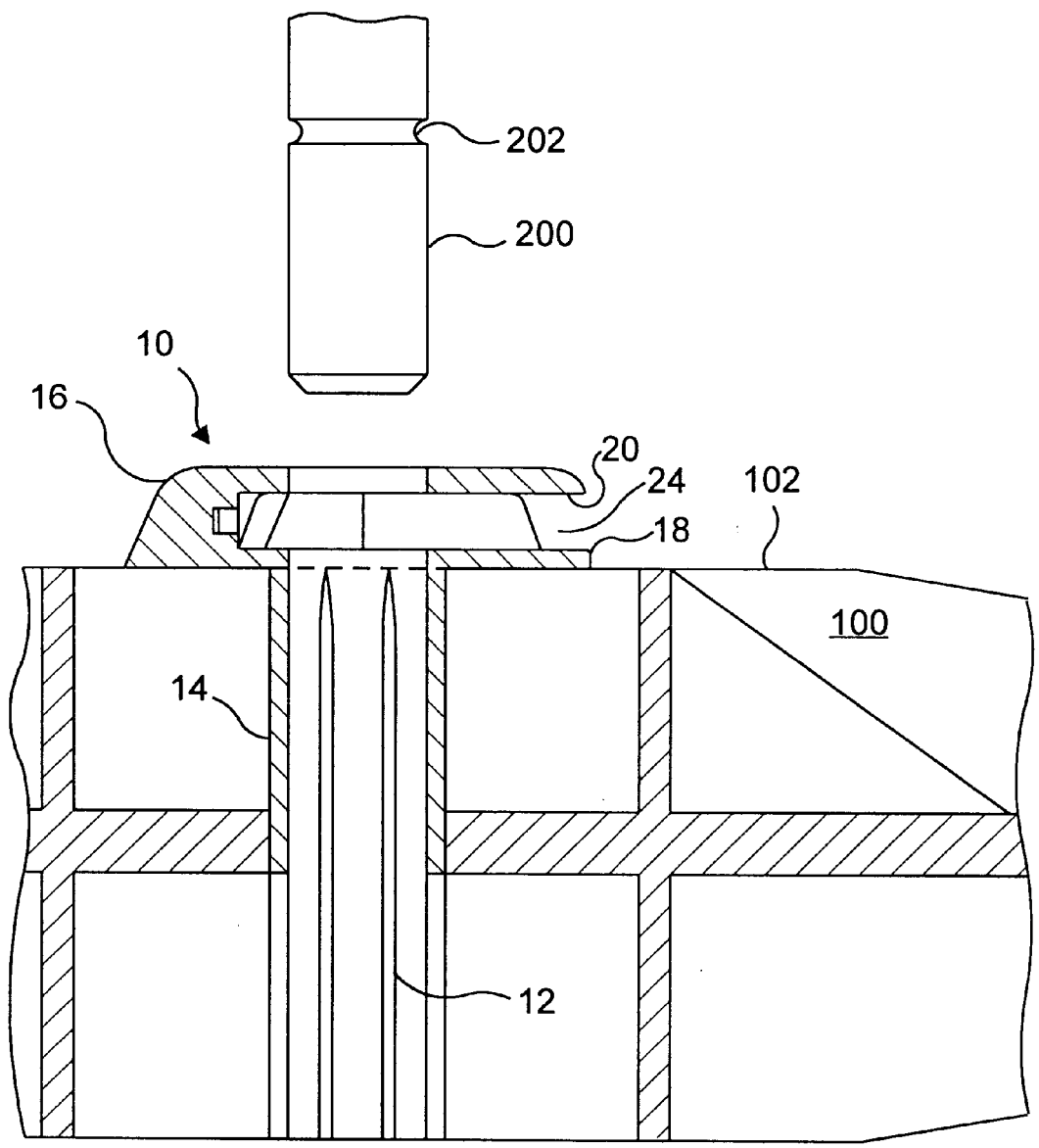
FIG. 1 is a side cross-sectional view of the locking armrest support assembly of the present invention, along with the armrest and the pin or-post to which the armrest is attached.

Referring now to the drawings in detail wherein like numerals indicate like elements throughout the several views, one sees that FIG. 1 is a cross-sectional view of an armrest 100 which includes the locking armrest support assembly 10 of the present invention.

The armrest 100 is a conventional horizontal structure with a vertical aperture 12 for engaging a structural post or pin 200.

The vertical aperture 12 of armrest 100 is formed by the hollow portion of a cylindrical sleeve 14. Cylindrical sleeve 14 can be molded into armrest 100, or can be implemented as a separate piece which engages an appropriately sized aperture in armrest 100.

Figure 2:
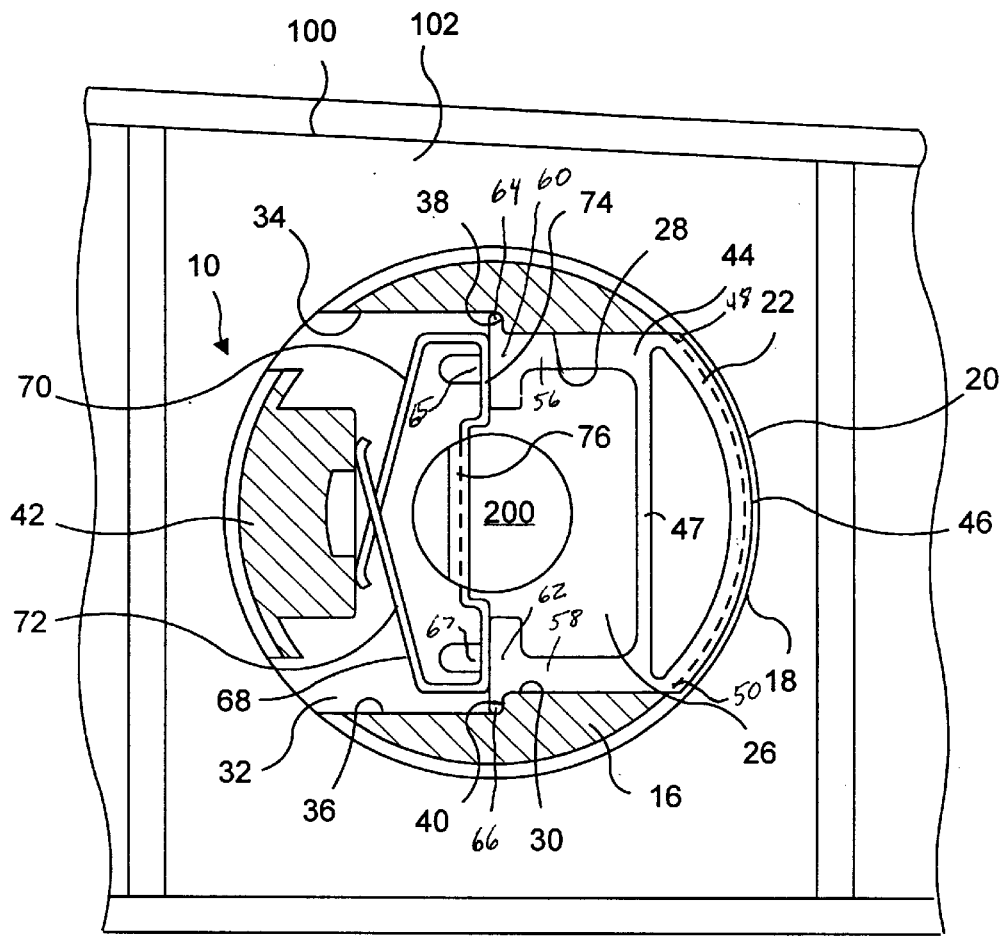
FIG. 2 is a top cross-sectional view of the locking armrest support assembly of the present invention showing, in particular, the spring engaging the notch of the pin or post.

The upper portion of cylindrical sleeve 14 includes a cap 16 of enlarged diameter which engages the upper surface 102 of armrest 100. A lateral side 18 of cap 16 includes a horizontal slit 20 into which button 44 is inserted. As shown in FIG. 2, slit 20 is formed by a lateral opening 24 which opens into an outer chamber 26 of somewhat reduced width as defined between sidewalls 28, 30. Slit 20 further includes an inner chamber 32 as defined by sidewalls 34, 36. The width of inner chamber 32 as defined by the distance between sidewalls 34, 36 is somewhat greater than the width of chamber 26 as defined by the distance between sidewalls 28, 30, thereby forming detent ledge 38 between sidewalls 28 and 34 and detent ledge 40 between sidewalls 30 and 36. Inner chamber 32 further includes spring support platform 42 at an outward circumferential location diametrically opposed from lateral opening 24. As further shown in FIG. 2, button 44 is inserted into slit 20.

Figure 3:
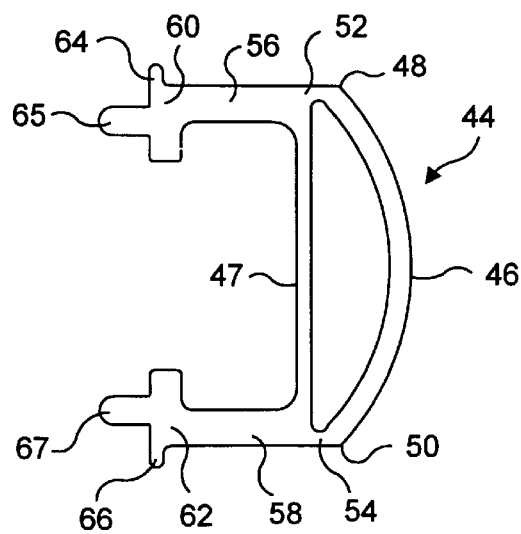
FIG. 3 is a front plan view of the button of the locking armrest support assembly of the present invention.

As shown in FIGS. 2 and 3, button 44 includes external arcuate portion 46 which is dimensioned to be flush with the circular shape of cap 16 when button 44 is in its outward biased position. External arcuate portion 46 includes ends 48, 50 which are separated by linear support element 47 which are integral with the proximal ends 52, 54 of parallel fingers 56, 58, respectively. Parallel fingers 56, 58 extend inwardly along the sidewalls 28, 30 of outer chamber 26. Sidewalls 28, 30 provide a path along which parallel fingers 56, 58 slide when button 44 is pushed. Distal ends 60, 62 of parallel fingers 56, 58 include outwardly extending detent flanges 64, 66 which engage detent ledges 38, 40 when button 44 is in its outward biased position (as shown in FIG. 2), thereby preventing button 44 from being removed from slit 20 and further maintaining external arcuate portion 46 in a flush relationship with cap 160 However, the flexible nature of parallel fingers 56, 58 allows fingers 56, 58 to be urged together somewhat during the initial installation of button 44 into slit 20. Upon sufficient insertion of button 44 into slit 20, fingers 56, 58 snap outwardly so that detent flanges 64, 66 engage detent ledges 38, 40 thereby maintaining button 44 in slit 20, but allowing for additional insertion as will be explained hereinbelow Distal ends 60, 62 of parallel fingers 56, 58 further include spring engaging members 65, 67, respectively, which engage spring 68.

As shown in FIG. 2, spring 68 includes oblique tines 70, 72 which cross each other and urge themselves against spring support platform 42. Oblique tines 70, 72 are joined by a support section 74 which is generally orthogonal to parallel fingers 56, 58. Support section 74 is illustrated with a somewhat indented central portion 76 which engages circumferential notch of structural post or pin 200.

In the position shown in FIG. 2, spring 68 engages circumferential notch 202 of structural post or pin 200 and further biases button 44 outwardly so that detent flanges 64, 66 are engaged against detent ledges 38, 40. This engagement of detent flanges 64, 66 against detent ledges 38, 40 further precludes any further outward movement of button 44 thereby maintaining the flush configuration of external arcuate portion 46 with cap 16 in the biased position. In this configuration, the armrest 100 is locked against any axial movement with respect to structural post or pin 200. However, one can push button 44 inwardly thereby urging support section 74 of spring 68 generally in the direction of spring support platform 42 and disengaging central portion 76 of support section 74 of spring 68 from circumferential notch 202. This allows the armrest 100 to be moved axially with respect to structural pin or post 200 and removed therefrom.

The assembly and installation of armrest 100 is extremely simple. Spring 68 is inserted into slit 20 and placed in position in inner chamber 32 with oblique tines 70, 72 resting against spring support platform 42. The parallel fingers 56, 58 of button 44 are urged or squeezed toward one another and inserted into outer chamber 26 until the parallel fingers 56, 58 snap outwardly thereby engaging detent flanges 64, 66 against detent ledges 38, 400 Spring 68 is then in a compressed configuration urging button 44 outwardly. Button 44 is pushed inwardly thereby moving central portion 76 of support section 74 of spring 68 in the direction spring support platform 42 and out of the path of vertical aperture 12. The structural post or pin 200 is then inserted into vertical aperture 12 until circumferential notch 202 aligns with central portion 76 of support section 74 of spring 68. Button 44 is then released and spring 68 urges central portion 76 into circumferential notch 202 and similarly urges button 44 into the configuration shown in FIG. 2.

Removal of the armrest 100 is accomplished merely by pushing button 44 so that central portion 76 of support section 74 of spring 68 disengages from circumferential notch 202.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. An apparatus for engaging an armrest to a post, the post including a notch, the apparatus including:
   an aperture;
   a cap portion on a surface of the armrest outwardly concentric with said aperture;
   a slit in said cap;
   a button engaged in said slit, said button having a path of travel within said slit from an outward position to an inward position; and
   a spring means for urging said button to said outward position, said spring means further engaging the notch in the post when said button is in said outward position, said spring means further being free of engagement with the notch in the post when said button is in said inward position.

2. The apparatus of claim 1 wherein said button includes detent means for limiting outward movement of said button thereby defining said outward position.

3. The apparatus of claim 2 wherein said button includes an outer portion which is substantially flush with said cap when said button is in said outward position.

4. The apparatus of claim 3 wherein said button includes two fingers which engage sidewalls of said slit, said fingers including outwardly flanged detent elements.

5. The apparatus of claim 4 wherein said slit includes an outer chamber and an inner chamber, said inner chamber being of a width greater than said outer chamber, thereby forming detent ledges between said inner chamber and said outer chamber, said detent ledges and said outwardly flanged detent elements thereby forming said detent means, said detent ledges being engaged by said outwardly flanged detent elements when said button is in said outward position.

6. The apparatus of claim 5 wherein said spring means includes a spring in said inner chamber which urges against said fingers of said button.

7. The apparatus of claim 6 wherein said spring includes a support portion which urges against said fingers of said button and further engages the notch of said post when said button is in said outward position, said spring further including two oblique tines attached to said support portion and urging against a portion of said inner chamber.

8. The apparatus of claim 7 wherein said slit is generally perpendicular to a longitudinal axis of said aperture.

\* \* \* \* \*